United States Patent
Takano

(10) Patent No.: US 9,386,399 B2
(45) Date of Patent: *Jul. 5, 2016

(54) METHOD AND SYSTEM FOR CONNECTING A COMMUNICATION APPARATUS TO A NETWORK

(75) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 285 days.

This patent is subject to a terminal disclaimer.

(21) Appl. No.: 13/880,810

(22) PCT Filed: Aug. 17, 2011

(86) PCT No.: PCT/JP2011/068622
§ 371 (c)(1),
(2), (4) Date: Apr. 22, 2013

(87) PCT Pub. No.: WO2012/077385
PCT Pub. Date: Jun. 14, 2012

(65) Prior Publication Data
US 2013/0203455 A1    Aug. 8, 2013

(30) Foreign Application Priority Data
Dec. 6, 2010   (JP) .................................. 2010-271868

(51) Int. Cl.
*H04W 4/00* (2009.01)
*H04W 48/18* (2009.01)
(Continued)

(52) U.S. Cl.
CPC .............. *H04W 4/005* (2013.01); *H04W 48/18* (2013.01); *H04W 76/048* (2013.01); *H04W 68/005* (2013.01)

(58) Field of Classification Search
CPC .. H04W 74/0833; H04W 88/16; H04W 8/005
USPC .......... 455/435.1, 41.2, 422.1, 458; 370/328, 370/401, 252, 338, 254, 310, 235, 311
See application file for complete search history.

(56) References Cited

U.S. PATENT DOCUMENTS

| 7,706,253 | B1 * | 4/2010 | Pampati | ............... H04M 7/0084 370/216 |
| 7,738,488 | B2 * | 6/2010 | Marsico et al. | ............... 370/466 |

(Continued)

FOREIGN PATENT DOCUMENTS

| EP | 2 001 194 A2 | 12/2008 |
| JP | 2001-69557 | 3/2001 |

(Continued)

OTHER PUBLICATIONS

Extended European Search Report issued May 9, 2014, in Patent Application No. 11847292.7.

(Continued)

*Primary Examiner* — Dominic Rego
(74) *Attorney, Agent, or Firm* — Chip Law Group

(57) ABSTRACT

Provided is a communication system including a base station, a communication apparatus, and a gateway apparatus including a first communication unit that communicates with the base station in a first communication method, a second communication unit that communicates with the communication apparatus in a second communication method, an identification information holding unit that holds a correspondence between first identification information in the first communication method and second identification information in the second communication method of the communication apparatus, and a category information holding unit to share category information showing a characteristic of the communication apparatus with the communication apparatus. The first communication unit performs communication of the communication apparatus in accordance with the category information with the base station by using the first identification information of the communication apparatus.

13 Claims, 16 Drawing Sheets

(51) Int. Cl.
*H04W 76/04* (2009.01)
*H04W 68/00* (2009.01)

(56) References Cited

U.S. PATENT DOCUMENTS

| | | | |
|---|---|---|---|
| 8,116,329 B2* | 2/2012 | Chou et al. ................... | 370/401 |
| 2002/0151270 A1* | 10/2002 | Johnston .................... | 455/3.05 |
| 2006/0133392 A1* | 6/2006 | Ajitomi ............... | H04L 12/2803 370/401 |
| 2007/0213071 A1* | 9/2007 | Hwang ..................... | 455/456.1 |
| 2008/0232310 A1* | 9/2008 | Xu ............................... | 370/329 |
| 2008/0304458 A1* | 12/2008 | Aghvami et al. ............. | 370/338 |
| 2009/0109925 A1* | 4/2009 | Nakamura ............ | H04L 63/062 370/331 |
| 2009/0252032 A1 | 10/2009 | Jiang et al. | |
| 2010/0046529 A1* | 2/2010 | Roberts et al. ................ | 370/401 |
| 2010/0111019 A1* | 5/2010 | Wu .............................. | 370/329 |
| 2010/0302998 A1* | 12/2010 | Bao et al. ..................... | 370/315 |
| 2011/0208866 A1* | 8/2011 | Marmolejo-Meillon et al. ............................. | 709/227 |

FOREIGN PATENT DOCUMENTS

| | | |
|---|---|---|
| JP | 2007-60212 | 3/2007 |
| JP | 2008-225844 | 9/2008 |
| JP | 2012-124602 | 6/2012 |

OTHER PUBLICATIONS

"3$^{rd}$ Generation Partnership Project; Technical Specification Group Services and System Aspects; Study on Enhancements for MTC", 3GPP TSG-SA WG1 Meeting #52, S1-103317, (Release 11), V0.3.0, XP 050468974, Nov. 8-12, 2010, 19 pages.

3$^{rd}$ Generation Partnership Project; Technical Specification Group Services and System Aspects; Study on Enhancements for MTC; (Release 11), 3GPP TR 22.888 V0.2.0, (Oct. 2010), Technical Report, 2010, 18 pages.

3$^{rd}$ Generation Partnership Project; Technical Specification Group Services and System Aspects; Service Requirements for Machine-Type Communications (MTC); Stage1 (Release 10), 3GPP TS 22.368 V10.2.0 (Sep. 2010), Technical Specification, 2010, 21 pages.

Office Action issued Aug. 26, 2014 in Japanese patent Application No. 2010-271868.

Vodafone, "Rejection of Connections towards a congested CN Node for UMTS and LTE", 3GPP TSG RAN WG3 #69bis, R3-102964, Agenda Item: 18, Document for: Discussion & Decision, Oct. 2010, 3 pages.

Chinese Office Action issued on Jul. 1, 2015 in patent application No. 201180057484.8.

* cited by examiner

METHOD AND SYSTEM FOR CONNECTING A COMMUNICATION APPARATUS TO A NETWORK

TECHNICAL FIELD

The present invention relates to a communication system and a communication apparatus.

BACKGROUND ART

Currently, the standardization of a wireless communication system of 4G is under way in 3GPP (Third Generation Partnership Project). According to 4G, improvements in maximum communication speed and quality improvements in cell edges can be realized by using technologies such as the relay and carrier aggregation. In addition, improvements of coverage are discussed by introducing base stations other than eNodeB (micro-cell base station) such as HeNodeB (Home eNodeB, femto-cell base station, small base station for mobile phones) and RHH (remote radio head). A relay apparatus (relay node) performing a relay is described in, for example, Patent Literature below.

In 3GPP, on the other hand, discussions about MTC (Machine Type Communications) are also under way. MTC is generally synonymous with M2M (Machine to Machine) and means communication between machines that is not directly used by humans. MTC is mainly performed between a server and an MTC terminal not directly used by humans.

As an MTC application in a medical system, for example, a case in which an MTC terminal collects electrocardiogram information of humans and transmits the electrocardiogram information to a server by using an uplink when some trigger condition is satisfied can be considered. As another MTC application, a case in which a vending machine is caused to function as an MTC terminal and a server causes vending machines under control to report sales at regular intervals (for example, 30 days) can also be considered.

Such an MTC terminal generally has, as an example, the following features, but each MTC terminal does not have to have all the following features and which features each MTC terminal has depends on the application.

Almost no movement (Low Mobility)
Small-capacity data transmission (Online Small Data Transmission)
Extremely low power consumption (Extra Low Power Consumption)
Handling by grouping MTC (Group based MTC Features)

CITATION LIST

Patent Literature

Patent Literature 1: JP 2007-60212 A

SUMMARY OF INVENTION

Technical Problem

However, the number of MTC terminals is expected to be enormous and it is important to efficiently manage the MTC terminals. Also, a case in which an MTC terminal has a communication interface incompatible with 4G can be considered.

The present invention is made in view of the above problems and an object thereof is to provide a novel and improved communication system and communication apparatus capable of connecting a communication apparatus such as an MTC terminal to a network provided by a base station.

Solution to Problem

According to an embodiment of the present disclosure, there is provided a communication system including a base station, a communication apparatus, and a gateway apparatus including a first communication unit that communicates with the base station in a first communication method, a second communication unit that communicates with the communication apparatus in a second communication method, an identification information holding unit that holds a correspondence between first identification information in the first communication method and second identification information in the second communication method of the communication apparatus, and a category information holding unit to share category information showing a characteristic of the communication apparatus with the communication apparatus. The first communication unit performs communication of the communication apparatus in accordance with the category information with the base station by using the first identification information of the communication apparatus.

The second communication unit may communicate with the communication apparatus by using the second identification information of the communication apparatus.

The second communication unit may transmit characteristic information to the communication apparatus and receives the category information of the communication apparatus changed based on the characteristic information from the communication apparatus. The first communication unit may transmit the category information received by the second communication unit to the base station. The category information holding unit may hold the category information received by the second communication unit.

The gateway apparatus may further include a characteristic information selection unit that selects the characteristic information based on the category information received from the communication apparatus and before being changed.

The characteristic information may show a characteristic recommended to the communication apparatus.

The gateway apparatus may further include an intermittent reception management unit that holds a reception period to intermittently receive paging from the base station for the communication apparatus and causes the second communication unit to notify the communication apparatus of a reception period having an offset for the reception period.

When data addressed to the communication apparatus is received by the first communication unit from the base station, the second communication unit may transmit the data to the communication apparatus. If the data addressed to the communication apparatus is successfully received, the first communication unit may transmit a reception confirmation signal to the base station before checking whether the data is successfully received by the communication apparatus.

The gateway apparatus may communicate with a plurality of communication apparatuses. The gateway apparatus may further include an adjustment unit that adjusts each reception period for the first communication unit to perform intermittent reception for each of the plurality of communication apparatuses. The adjustment unit may adjust each of the reception periods in a manner that a reception period other than one reception period is an integral multiple of the one reception period.

The gateway apparatus may communicate with a plurality of communication apparatuses. The first communication unit may intermittently receive in a short reception period or a long reception period for the communication apparatuses in an active state and intermittently receives in a sleep reception period for the communication apparatuses in a sleep state. The long reception period and the sleep reception period may be set as integral multiples of the short reception period and each reception period is set in a manner that phases thereof are uniform.

The first communication unit may acquire a timing advance value by performing a random access procedure to the base station and uses the common timing advance value for communication with a plurality of communication apparatuses.

The first communication unit may transmit an acquisition request of the first identification information of each of the plurality of communication apparatuses to the base station to acquire the first identification information of each of the plurality of communication apparatuses from the base station.

The first communication method may be a mobile communication method and the second communication method may be a wireless LAN communication method.

The communication apparatus may be implemented in the gateway apparatus. The first communication method may be a mobile communication method and the second communication method may be a communication method using a dedicated interface in the gateway apparatus.

According to an embodiment of the present disclosure, there is provided a communication apparatus configured to communicate with a gateway apparatus in a second communication method, the gateway apparatus communicating with a base station in a first communication method, communicating with the communication apparatus in the second communication method, holding a correspondence between first identification information in the first communication method and second identification information in the second communication method of the communication apparatus, and sharing category information showing a characteristic of the communication apparatus.

Advantageous Effects of Invention

According to the present invention, as described above, a communication apparatus such as an MTC terminal can be connected to a network provided by a base station.

DESCRIPTION OF EMBODIMENT

Figure 1:
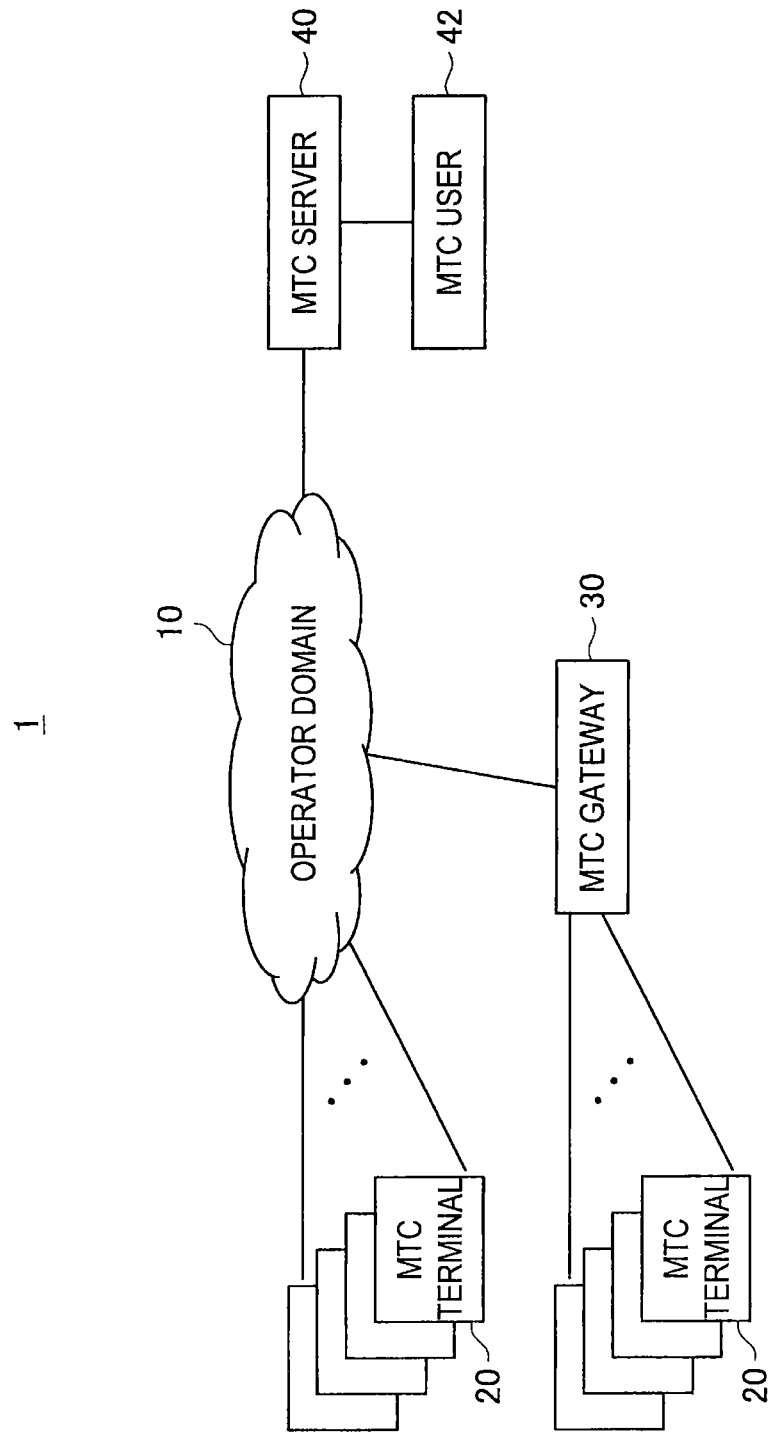
FIG. 1 is an explanatory view showing a configuration example of a wireless communication system.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

In the present specification and drawings, a plurality of structural elements having substantially the same functional configuration may be distinguished by attaching different alphabets to the end of the same reference numeral. For example, a plurality of structural elements having substantially the same functional configuration is distinguished when necessary like MTC terminals 20A, 20B, 20C. However, if there is no need to distinguish a plurality of structural elements having substantially the same functional configuration, only the same reference numeral is attached. If there is no need to particularly distinguish, for example, the MTC terminals 20A, 20B, 20C, the terminals are called simply the MTC terminal 20.

"Description of Embodiment" will be described in the order of items shown below:

1. Overview of Wireless Communication System
1-1. Configuration of Wireless Communication System
1-2. Implementation Form of MTC Gateway
1-3. Consideration of MTC Gateway
1-4. Categories of UE and MTC Terminal
1-5. Paging
1-6. Random Access
2. Description of Each Embodiment
2-1. First Embodiment
2-2. Second Embodiment
2-3. Third Embodiment 2-4. Fourth Embodiment
2-5. Fifth Embodiment
3. Conclusion 1. Overview of Wireless Communication System Currently, the standardization of a wireless communication system of 4G is under way in 3GPP. The embodiments of the present invention can be applied to, as an example, a wireless communication system of 4G and thus, an overview of the wireless communication system of 4G will first be provided.

[1-1. Configuration of Wireless Communication System]

FIG. 1 is an explanatory view showing a configuration example of a wireless communication system 1. As shown in FIG. 1, the wireless communication system 1 includes an operator domain 10, an MTC terminal 20, an MTC gateway 30, and an MTC server 40.

The operator domain 10 includes MME (Mobility Management Entity) that sets and releases sessions for data communication and controls handover, S-GW (Serving Gateway) that routes and transfers user data, and base stations like eNodeB, a relay node, and Home eNodeB, which is a small base station for home.

The MTC server 40 is a node that manages each of the MTC terminals 20 and controls each of the MTC terminals 20 to, for example, collect information. FIG. 1 shows an example in which the MTC server 40 is arranged outside the operator domain 10, but the MTC server 40 may also be arranged inside the operator domain 10. The MTC server 40 operates according to a command issued by, for example, an MTC user 42.

The MTC terminal 20 is a wireless terminal, which is discussed in 3GPP, customized to MTC as communication between machines that is not directly used by humans. The MTC terminal 20 performs communication according to the operator domain 10 and the application. The MTC terminal 20 also performs two-way communication with the MTC server 40 via the operator domain 10.

As an MTC application in a medical system, for example, a case in which the MTC terminal 20 collects electrocardiogram information of humans and transmits the electrocardiogram information to a server by using an uplink when some trigger condition is satisfied can be considered. As another MTC application, a case in which a vending machine is caused to function as the MTC terminal 20 and the MTC server 40 causes vending machines under control to report sales at regular intervals (for example, 30 days) can also be considered.

The MTC terminal 20 described above generally has, as an example, the following features, but each of the MTC terminals 20 does not have to have all the following features and which features each of the MTC terminals 20 has depends on the application.

Almost no movement (Low Mobility)
Small-capacity data transmission (Online Small Data Transmission)
Extremely low power consumption (Extra Low Power Consumption)
Handling by grouping MTC (Group based MTC Features)

Incidentally, the MTC 20 is an example of the user terminal (UE: User Equipment) and the embodiments of the present invention are applicable also to non-MTC terminals such as mobile phones and PCs (Personal Computers).

As shown in FIG. 1, one or a plurality of the MTC terminals 20 is subordinate to the MTC gateway 30, which is connected to the operator domain 10 including base stations by representing the subordinate MTC terminals 20. The MTC gateway 30 is considered to be introduced from the following background:

(1) The number of the MTC terminals 20 is expected to be enormous and thus, the management by the base station is simplified by a plurality of the MTC terminals 20 being bundled and handled by the MTC gateway 30.
(2) A case in which the function of the MTC terminal 20 is implemented in any one apparatus can be considered.
(3) A case in which the MTC terminal 20 has a communication interface incompatible with 4G such as Zigbee and wireless LAN defined by IEEE802.11 can be considered.

[1-2. Implementation Form of MTC Gateway]

The above MTC gateway 30 can be realized in various forms in relation to a base station 12 and the MTC terminal 20. Some examples the implementation form of the MTC gateway 30 will be described below with reference to FIGS. 2 to 5.

Figure 2:
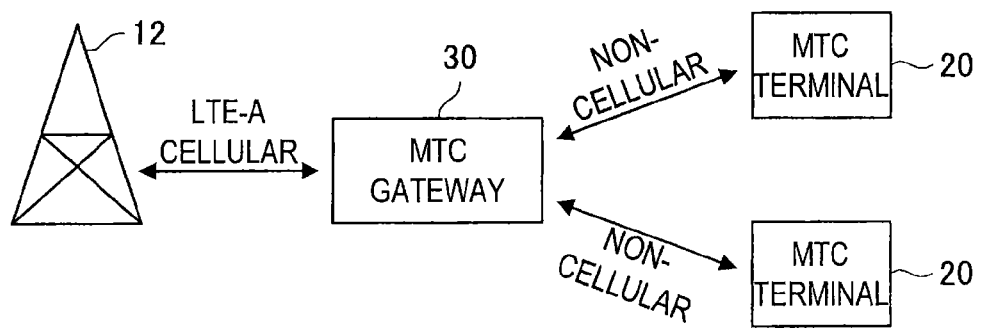
FIG. 2 is an explanatory view showing a first implementation form of an MTC gateway.

FIG. 2 is an explanatory view showing a first implementation form of the MTC gateway 30. In the first implementation form, the MTC gateway 30 is connected to the base station 12 by an LTE-A cellular and connected to the MTC terminal 20 by a non-cellular such as Zigbee and wireless LAN.

Figure 3:
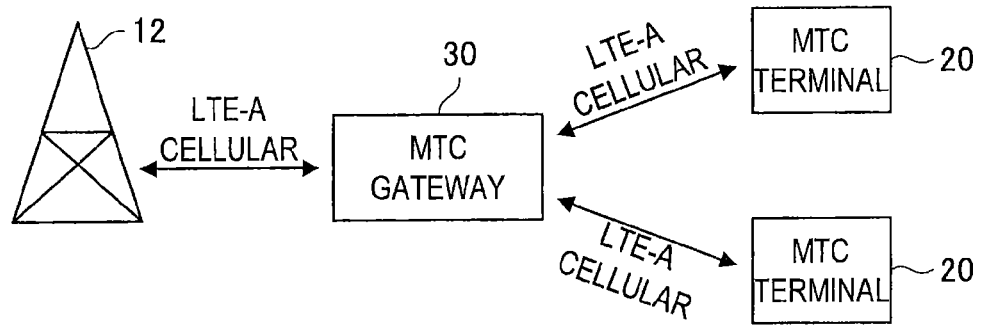
FIG. 3 is an explanatory view showing a second implementation form of the MTC gateway.

FIG. 3 is an explanatory view showing a second implementation form of the MTC gateway 30. In the second implementation form, the MTC gateway 30 is connected to the base station 12 by the LTE-A cellular and connected to the MTC terminal 20 also by the LTE-A cellular.

Figure 4:
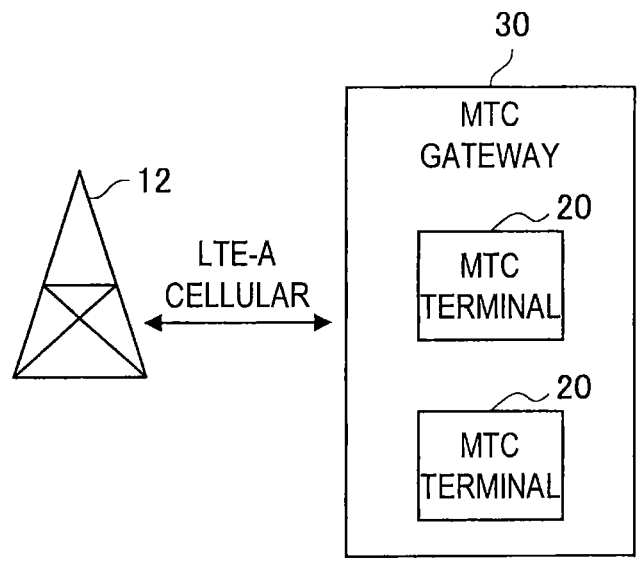
FIG. 4 is an explanatory view showing a third implementation form of the MTC gateway.

FIG. 4 is an explanatory view showing a third implementation form of the MTC gateway 30. In the third implementation form, the function of the MTC terminal 20 is implemented in the MTC gateway 30 and thus, the MTC gateway 30 is connected to the base station 12 by the LTE-A cellular and connected to the MTC terminal 20 through a dedicated interface in the MTC gateway 30.

Figure 5:
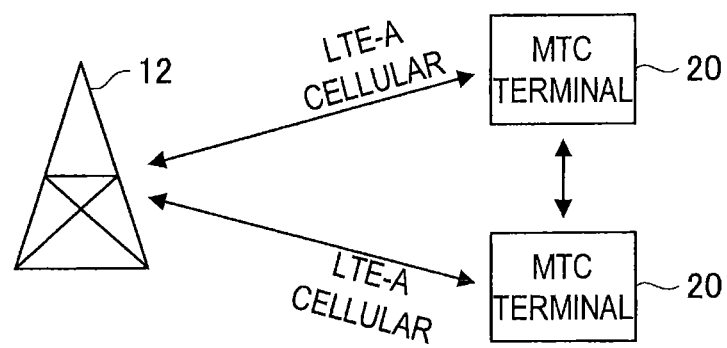
FIG. 5 is an explanatory view showing a fourth implementation form of the MTC gateway.

FIG. 5 is an explanatory view showing a fourth implementation form of the MTC gateway 30. In the fourth implementation form, though the entity of the MTC gateway 30 is not present, the MTC terminals 20 operate in collaboration and the function of the MTC gateway 30 is virtually realized by, for example, one of the MTC terminals 20 representing the other MTC terminal 20.

[1-3. Consideration of MTC Gateway]

Cases of how the above MTC gateway 30 is recognized by the base station 12 and the MTC terminal 20 will be considered below.

(The MTC Gateway 30 Viewed from the Base Station 12)

Case 1

The MTC gateway 30 is recognized by the base station 12 as one piece of UE by the subordinate MTC terminals 20 being completely represented by the MTC gateway 30 and the presence of the MTC terminals 20 subordinate to the MTC gateway 30 cannot be recognized by the base station 12. In this case, the base station 12 needs to communicate with only the MTC gateway 30 and thus, the load on C-Plane can be reduced by reduced signaling. However, when a plurality of the MTC terminals 20 having different categories actually belongs to the MTC gateway 30, it is difficult to represent the MTC gateway 30 as a single category. The category will be described later in "1-4. Categories of UE and MTC Terminal".

Case 2

The MTC gateway 30 is actually present and performs communication, but the MTC gateway 30 is logically transparent and only the MTC terminals 20 appear to be present from the base station 12. In this case, the base station 12 can directly handle the category and attributes of each of the MTC terminals 20, but signaling does not decrease.

Case 3

The MTC gateway 30 may transparently relay communication between the base station 12 and the MTC terminal 20, and both the MTC gateway 30 and the MTC terminal 20 are recognized by the base station 12 by a portion of settings or communication being performed by representing the MTC terminals 20. In this case, the MTC gateway 30 performs a portion of settings and the like by representing the MTC terminals 20 and thus, the signaling load can be reduced.

Case 4

The entity of the MTC gateway 30 is not present and the base station 12 directly communicates with each of the MTC terminals 20, and the MTC terminals 20 operate in collaboration and the MTC gateway 30 is recognized by the base station 12 as if to be logically present by one of the MTC terminals 20 representing the other MTC terminals 20.

The MTC gateway 30 in Case 2 and Case 3 has some similarities to a relay node of 4G currently being discussed, but is different in the way of recognition by eNodeB or UE (including the MTC terminal 20). More specifically, the relay node is recognized by eNodeB as a relay node and recognized by UE as eNodeB, but the MTC gateway 30 is recognized by the base station 12, as described above, as the MTC terminal 20 and recognized by the MTC terminal 20, as will be described later, as a base station such as Zigbee or wireless LAN. However, the way the relay node should be is currently still being discussed and the MTC gateway 30 according to the present embodiment could be defined as a category of the relay node.

(MTC Gateway 30 Viewed from the MTC Terminal 20)

Case A

The MTC gateway 30 and the MTC terminal 20 are connected by wireless LAN or the like and the MTC gateway 30 is recognized by the MTC terminal 20 as an access point of wireless LAN or the like. In this case, even if the MTC terminal 20 is a non-cellular system, the MTC terminal 20 can be accommodated in a 4G communication system, but it is difficult for each of the MTC terminals 20 to operate as requested by 4G.

Case B

The function of the MTC terminal 20 is implemented in the MTC gateway 30 and the MTC terminal 20 and the MTC gateway 30 are connected by a dedicated interface. In this case, there is no need to individually prepare a plurality of the MTC terminals 20 and, for example, a case in which the function of the MTC terminals 20 is implemented in one apparatus such as a mobile phone can be considered.

Case C

The entity of the MTC gateway 30 is not present and the base station 12 directly communicates with each of the MTC terminals 20, and the MTC terminals 20 operate in collaboration and the MTC gateway 30 is recognized by the base station 12 as if to be logically present by one of the MTC terminals 20 representing the other MTC terminals 20. This case has an advantage that the MTC gateway 30 is not needed, but how the MTC terminal 20 collaborates is matter to be discussed.

Case D

The MTC gateway 30 is connected to the MTC terminal 20 in a form conforming to a 4G circuit.

(Combination of Each Case)

Cases in which the MTC gateway 30 is recognized by the base station 12 like Cases 1 to 4 and cases in which the MTC gateway 30 is recognized by the MTC terminal 20 like Cases A to D have been described. As implementation form examples of the MTC gateway 30, combinations of Cases 1 to 4 and Cases A to C are shown below.

TABLE 1

| Gateway implementation form | Gateway viewed from base station | Gateway viewed from MTC terminal | Advantages | Disadvantages |
|---|---|---|---|---|
| Case(i) | (1) | (A) | | It is difficult to define the category of the gateway. |
| Case(ii) | (1) | (B) | | It is difficult to define the category of the gateway. |
| Case(iii) | (2) | (A) | | Signaling does not decrease. |
| Case(iv) | (2) | (B) | | Signaling does not decrease. |
| Case(v) | (3) | (A) | Signaling may be reduced. | It is not clear in which case the gateway should represent. |
| Case(vi) | (3) | (B) | Signaling may be reduced. A plurality of MTC terminals can be implemented in one terminal. | It is not clear in which case the gateway should represent. |
| Case(vii) | (4) | (C) | The gateway terminal itself is not needed. | By which means to achieve collaboration between MTC is unknown. |

The description herein focuses on the MTC gateway 30 in the form corresponding to the above case (v) or (vi), that is, the MTC gateway 30 viewed from the base station 12 corresponds to Case 3 and the MTC gateway 30 viewed from the MTC terminal 20 corresponds to Case A or Case B.

[1-4. Categories of UE and MTC Terminal]

Each embodiment of the present invention described below includes an embodiment related to the category, an embodiment related to paging, and an embodiment related to random access. Thus, before starting to describe each embodiment, the category, paging, and random access will be described.

In LTE, the category of UE is classified into Category 1 to Category 5. These categories are classified in accordance with UE capabilities.

TABLE 2

| | Category1 | Category2 | Category3 | Category4 | Category5 |
|---|---|---|---|---|---|
| Peak rate downlink | 10 Mbps | 50 Mbps | 100 Mbps | 150 Mbps | 300 Mbps |
| Peak rate uplink | 5 Mbps | 25 Mbps | 50 Mbps | 50 Mbps | 75 Mbps |
| MIMO downlink | optional | 2 × 2 | 2 × 2 | 2 × 2 | 4 × 4 |

Figure 6:
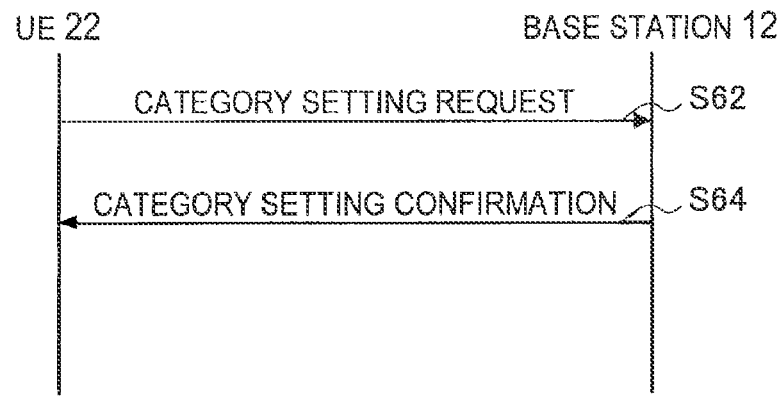
FIG. 6 is an explanatory view showing a sequence for category settings.

FIG. 6 is an explanatory view showing a sequence for category settings. As shown in FIG. 6, UE 22 makes an application for the category thereof to the base station 12 (S62) and the base station 12 returns a confirmation signal to the UE 22 (S64). Incidentally, the UE 22 can change the category by making an application of the category again after being detached and reattached.

The categories of UE have been described and classifying the MTC terminal 20 into a plurality of categories can also be considered. Thus, an example of categories of the MTC terminal 20 discussed by the present inventors is shown below.

TABLE 3

|  | Category1 | Category2 | Category3 | Category4 | Category5 |
|---|---|---|---|---|---|
| Mobility | Not move | Low Mobility | Low Mobility | High Mobility | High Mobility |
| Power Consumption | High | Low | Ultra Low | Low | Ultra Low |
| Small Data Transmission | Large | Small | Small | Small | Small |
| Time tolerant | long | long | long | short | long |

As described above, the category can be decided in accordance with capabilities (characteristics) of each feature such as Low Mobility and Power Consumption of the MTC terminal 20. The above category classification is an example only and features of the MTC terminal 20 range widely and therefore, more categories may be provided.

The base station 12 is considered to control communication with each of the MTC terminals 20 according to the category of each of the MTC terminals 20. For example, the base station 12 may make adjustment requests to the MTC terminal 20 whose Mobility is "High Mobility" more frequently than to the MTC terminal 20 whose Mobility is "Low Mobility".

[1-5. Paging]

The UE operating in sleep mode observes the paging channel transmitted from the base station 12 in a DRX (Discontinues Reception) period and, if there is no message addressed to the UE, returns to a lower power consumption state and, if there is a message addressed to the UE, operates according to the message. The paging channel contains an incoming call making a notification that data addressed to the UE is present in the base station 12 and a message making it known that system information (for example, the frequency used) of the base station 12 has been updated. Such a sleep mode function is expected to be implemented also in the MTC terminal 20.

[1-6. Random Access]

The UE establishes a connection to the base station 12 by executing a procedure called random access with the base station 12. In the random access procedure, a timing advance value to adjust the transmission timing of an uplink by the UE is obtained. Though the distance between each piece of UE and the base station 12 is different, a plurality of pieces of UE can multiplex resource blocks in an uplink by making adjustments using the timing advance value so that data transmitted from each piece of UE reaches the base station 12 at the same time.

The random access procedure is roughly divided into two types of a contention type and a contention free type. The contention type is basically used, but the contention free type may also be used for more reliable random access. For example, the contention free type is used to connect to the new base station 12 after handover. However, some sequences of 64 provided sequences are used for the contention free type and thus, the contention free type may not always be usable.

Figure 7:
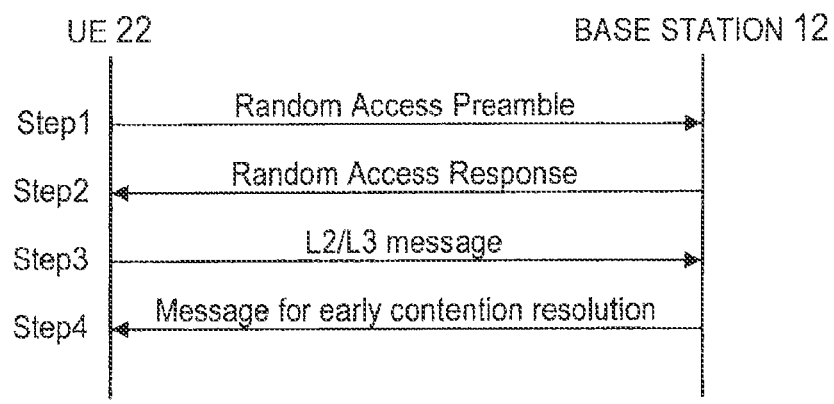
FIG. 7 is a sequence diagram showing a contention type random access procedure.

FIG. 7 is a sequence diagram showing the above contention type random access procedure. As shown in FIG. 7, first the UE 22 transmits a random access preamble to the base station 12 (Step 1). Each of 64 sequences provided as a random access preamble is orthogonal and thus, even if a different sequence is transmitted to the same resources (at the same time, at the same frequency) as a random access preamble, the base station 12 can separate each random access preamble. However, if random access preambles of the same sequence are transmitted using the same resources, it is difficult for the base station 12 to detect each random access preamble due to the collision.

If a random access preamble is successfully received from the UE 22, the base station 12 judges the distance from the UE 22 based on the reception timing of the random access preamble to calculate the timing advance value for the UE 22 to adjust the transmission timing.

Then, the base station 12 transmits a random access response to the UE 22 (Step 2). The random access response contains the above timing advance value and also scheduling information for an uplink. However, the step is not executed if there is no available resource for scheduling an uplink.

Then, the UE 22 transmits L2/L3 messages by using resources indicated by the scheduling information received in Step 2 as a connection request (Step 3). Incidentally, a case when the same random access preamble is transmitted by a plurality of pieces of the UE 22 in Step 1 and the base station 12 successfully receives one of the random access preambles can be considered. In this case, the plurality of pieces of the UE 22 recognizes that the random access response transmitted from the base station 12 in Step 2 is addressed to the respective pieces of the UE 22 and the plurality of pieces of the UE 22 transmits the L2/L3 messages using the same resources. Thus, the base station 12 can receive none of the L2/L3 messages or one of the L2/L3 messages transmitted from the plurality of pieces of the UE 22.

If the L2/L3 messages transmitted from the UE 22 are successfully received in Step 3, the base station 12 returns ACK to the UE 22 (Step 4). If there is no available resource for ACK transmission, the base station 12 does not return ACK. Thus, the UE 22 recognizes that the random access is successful by receiving ACK in Step 4.

2. Description of Each Embodiment

As described in "2-1. First Embodiment" to "2-5. Fifth Embodiment" in detail as examples, the present invention is carried out in various forms. Each embodiment will successively be described below.

2-1. First Embodiment

Focus Point

Because an MTC gateway is transparent when viewed from the base station 12, if the MTC gateway simply relays information from the base station to an MTC terminal, delay requirements may not be satisfied. When, for example, hybrid ARQ (Automatic Retransmission Request) is used, 8 ms is defined as the round trip time. However, if the MTC gateway simply relays information from the base station to the MTC terminal, there may be cases when the round trip time cannot be satisfied. The hybrid ARQ is a Stop And Wait type method by which the transmitter waits to transmit the next data until ACK or NACK for transmission data is received.

Also in the random access procedure, if the MTC terminal transmits L2/L3 after receiving a random access response shown in FIG. 7 via the MTC gateway, a problem of delay arises like the above case.

Therefore, it is not preferable to cause the MTC gateway to operate simply to relay by installing all information about 4G in the MTC terminal from the viewpoint of delay or response. On the other hand, it is not realistic to install all information about 4G in the MTC gateway.

The first embodiment of the present invention is made in view of the above circumstances as a focus point and according to the first embodiment of the present invention, it is possible to provide a transparent aspect or an aspect to represent MTC terminals to an MTC gateway. The first embodiment of the present invention will be described in detail below with reference to FIGS. 8 to 12.

Configuration of the First Embodiment

Figure 8:
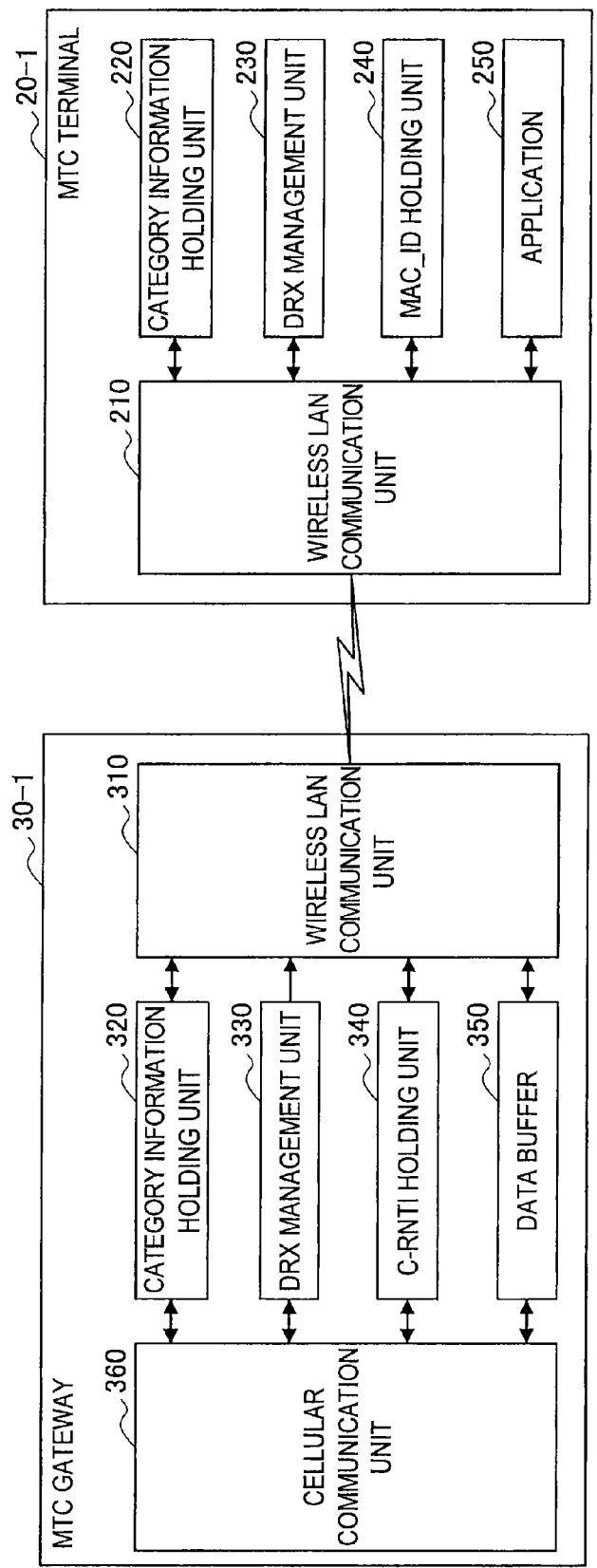
FIG. 8 is an explanatory view showing a configuration of an MTC terminal 1 and the MTC gateway according to a first embodiment of the present invention.

FIG. 8 is an explanatory view showing the configuration of an MTC terminal 20-1 and an MTC gateway 30-1 according to the first embodiment of the present invention.

As shown in FIG. 8, the MTC terminal 20-1 includes a wireless LAN communication unit 210, a category information holding unit 220, a DRX management unit 230, a MAC_ID holding unit 240, and an application 250. The MTC gateway 30-1 includes a wireless LAN communication unit 310, a category information holding unit 320, a DRX management unit 330, a C-RNTI holding unit 340, and a data buffer 350.

The wireless LAN communication unit 210 of the MTC terminal 20-1 performs wireless communication with the wireless LAN communication unit 310 (second communication unit) of the MTC gateway 30-1 according to the wireless communication such as IEEE802.11a, b, n, or ac. FIG. 8 shows an example in which the MTC terminal 20-1 and the MTC gateway 30-1 are connected by wireless LAN as an example of a non-cellular system (mobile communication method, second communication method), but the MTC terminal 20-1 and the MTC gateway 30-1 may also be connected by another non-cellular system (for example, Zigbee).

Further, as shown in FIG. 4, the function of the MTC terminal 20-1 may be implemented in the MTC gateway 30-1 as software and in this case, the MTC terminal 20-1 may be connected to the MTC gateway 30-1 via a dedicated interface.

The category information holding unit 320 of the MTC gateway 30-1 holds category information of the MTC terminal 20-1. The category information is considered to change due to the application 250 in the MTC terminal 20-1 and so is also held by the category information holding unit 220 of the MTC terminal 20-1. Thus, transparency is realized by category information being shared by the MTC terminal 20-1 and the MTC gateway 30-1.

The DRX management unit 330 (intermittent reception management unit) of the MTC gateway 30-1 holds and manages the DRX period (intermittent reception period) for a cellular communication unit 360 of the MTC gateway 30-1 to receive paging information for the MTC terminal 20-1. Similarly, the DRX management unit 230 of the MTC terminal 20-1 holds the DRX period for the wireless LAN communication unit 210 to receive paging information transferred from the MTC gateway 30-1. While details thereof will be described with reference to FIG. 12, the DRX period of the MTC terminal 20-1 has an offset for the DRX period of the MTC gateway 30-1.

The C-RNTI holding unit 340 (identification information holding unit) of the MTC gateway 30-1 associates and holds C-RNTI as identification information of the MTC terminal 20-1 in 4G and MAC_ID as identification information of the MTC terminal 20-1 in wireless LAN. On the other hand, the MAC_ID holding unit 240 of the MTC terminal 20-1 holds MAC_ID of the MTC terminal 20-1. Incidentally, in addition to MAC_ID, the MTC terminal 20-1 may hold C-RNTI.

The data buffer 350 of the MTC gateway 30-1 is a buffer to temporarily hold data to be relayed between the base station 12 and the MTC terminal 20-1. For example, data to be transmitted from the base station 12 to the MTC terminal 20-1 and data to be transmitted from the MTC terminal 20-1 to the base station 12 are temporarily held in the data buffer 350.

The cellular communication unit 360 (first communication unit) of the MTC gateway 30-1 performs communication with the base station 12 according to 4G (first communication method).

In the present embodiment, as described above, the MTC terminal 20-1 is caused to hold category information, MAC_ID corresponding to C-RNTI, and the DRX period and other 4G processing is performed by the MTC gateway 30-1 as a proxy. The random access, data communication, and DRX operation according to the present embodiment will concretely be described below.

Operation According to the First Embodiment

Random Access

Figure 9:
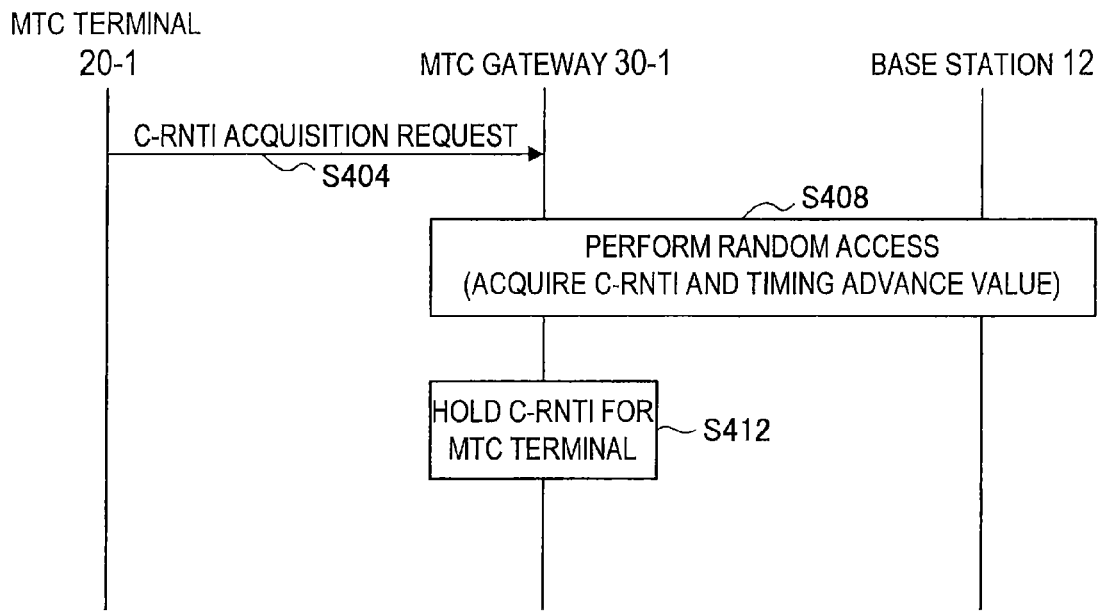
FIG. 9 is a sequence diagram showing a random access procedure for each MTC terminal.

FIG. 9 is a sequence diagram showing a random access procedure for each of the MTC terminals 20-1. As shown in FIG. 9, when an acquisition request of C-RNTI is received from the MTC terminal 20-1 (S404), the MTC-gateway 30-1 performs random access to the base station 12 (S408).

The timing advance value and C-RNTI for the MTC terminal 20-1 are acquired by the random access in S408 and so the MTC gateway 30-1 holds the acquired C-RNTI for the MTC terminal 20-1 in the C-RNTI holding unit 340 (S412).

Then, if a plurality of the MTC terminals 20-1 is subordinate, the MTC gateway 30-1 repeats the processing shown in FIG. 9 as many times as the number of the subordinate MTC terminals 20-1. Incidentally, the MTC gateway 30-1 may notify the MTC terminal 20-1 of the acquired C-RNTI.

Data Communication

Figure 10:
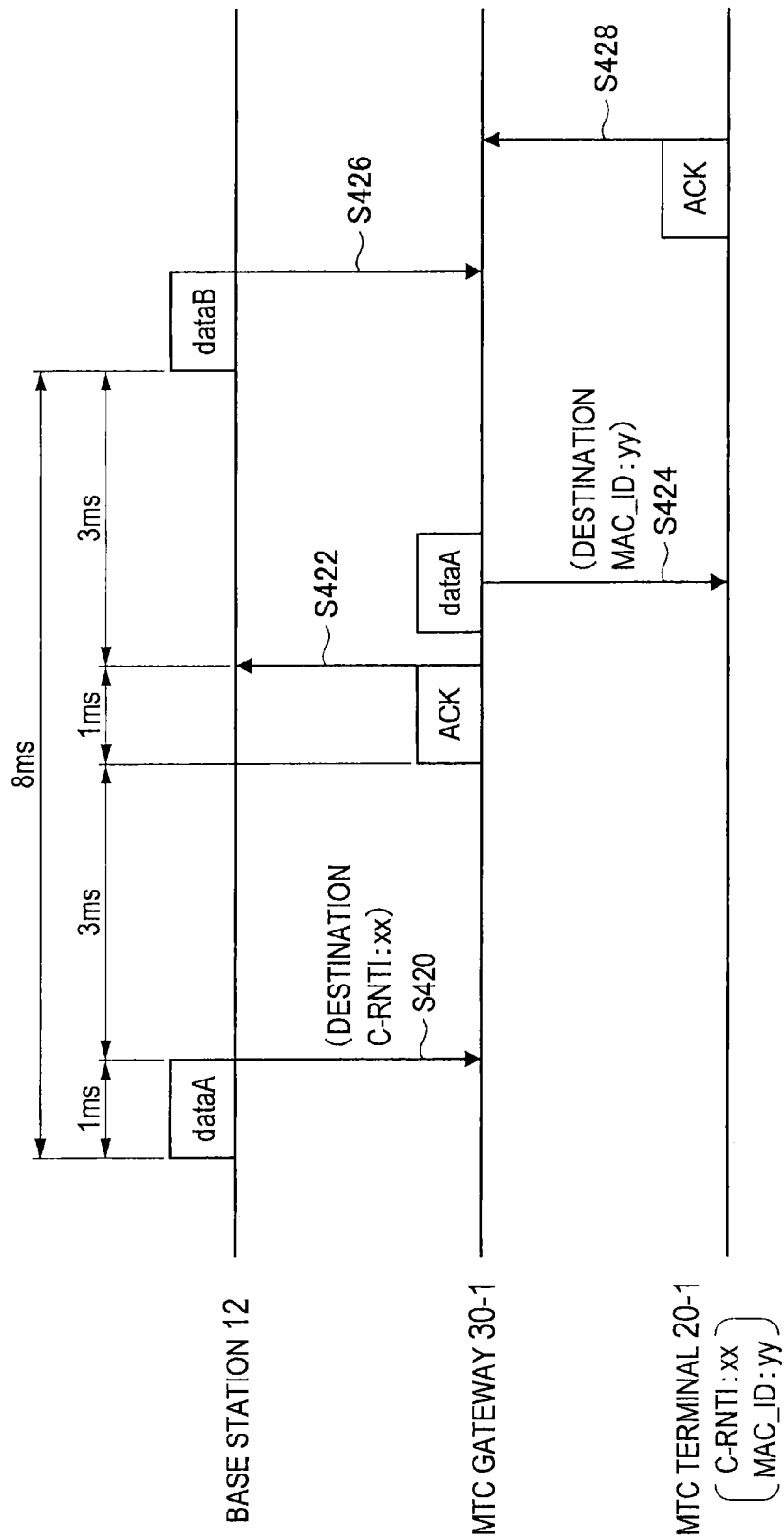
FIG. 10 is an explanatory view showing communication concerning the MTC terminal.

FIG. 10 is an explanatory view showing communication concerning the MTC terminal 20-1. As shown in FIG. 10, a case when the base station 12 transmits data to the MTC terminal 20-1 whose C-RNTI is "xx" and whose MAC_ID is "yy" will be considered. In this case, the base station 12 transmits data A by setting C-RNTI:xx as the address (S420).

Then, if the data A is successfully received, the MTC gateway 30-1 returns ACK to the base station 12 before whether the data A is successfully received by the MTC terminal 20-1 is checked (S422). When ACK is received from the MTC gateway 30-1, the base station 12 transmits the next data B (S426). If the reception of data A fails, the MTC gateway 30-1 returns NACK and the base station 12 retransmits the data A.

On the other hand, if the data is successfully received, the MTC gateway 30-1 sets MAC_ID:yy as the address and transmits the data A to the MTC terminal 20-1 (S424). Then, if the data A is successfully received, the MTC terminal 20-1 returns ACK to the MTC gateway 30-1 (S428).

As described above, the round trip time defined for hybrid ARQ can be satisfied while realizing transparency by ACK/NACK being returned by the MTC gateway 30-1 as a proxy.

—DRX

Figure 11:
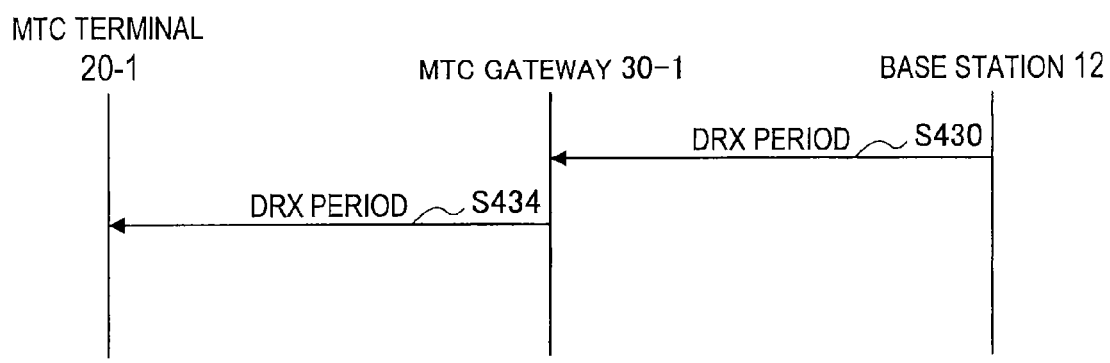
FIG. 11 is an explanatory view showing a transfer sequence of a DRX period.

FIG. 11 is an explanatory view showing a transfer sequence of a DRX period. As shown in FIG. 11, when the DRX period to intermittently receive paging for the MTC terminal 20-1 is received from the base station 12, the MTC gateway 30-1 holds the DRX period in the DRX management unit 330 (S430).

Then, the DRX management unit 330 of the MTC gateway 30-1 causes the wireless LAN communication unit 310 to transmit a DRX period having an offset for the DRX period received from the base station 12 to the MTC terminal 20-1 (S434). Subsequently, the DRX management unit 230 of the MTC terminal 20-1 holds the DRX period received by the wireless LAN communication unit 310. The relationship between the DRX period of the MTC gateway 30-1 and the DRX period of the MTC terminal 20-1 will be described with reference to FIG. 2.

Figure 12:
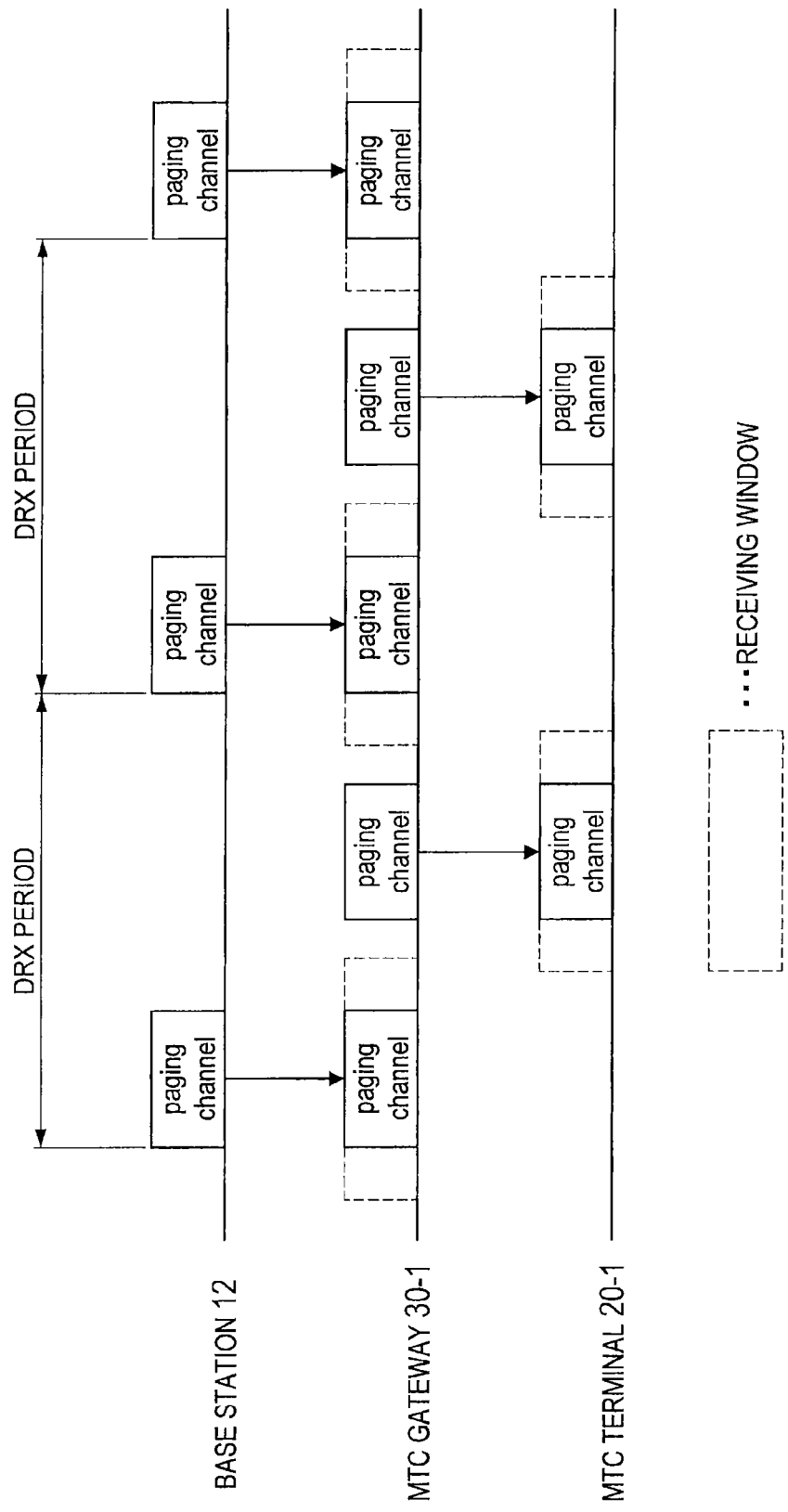
FIG. 12 is an explanatory view showing intermittent reception by the MTC gateway and the MTC terminal.

FIG. 12 is an explanatory view showing intermittent reception by the MTC gateway 30-1 and the MTC terminal 20-1. As shown in FIG. 12, the MTC terminal 20-1 performs intermittent reception in conjunction with the MTC gateway 30-1. In consideration of the delay between reception and transmission of a paging channel by the MTC gateway 30-1, the DRX period of the MTC terminal 20-1 is set so as to have an offset for the DRX period of the MTC gateway 30-1.

According to the first embodiment of the present invention, as described above, the MTC gateway 30-1 having a transparent aspect can be realized while satisfying the delay requirements in 4G.

2-2. Second Embodiment

Focus Point

A plurality of MTC terminals classified into different categories could be subordinate to an MTC gateway. However, category features of some MTC terminal and category features of another MTC terminal could be contradictory. For example, while Mobility of an MTC terminal classified into Category 2 shown in Table 3 is "Low Mobility", Mobility of an MTC terminal classified into Category 5 is "High Mobility". Thus, a contradiction arises if an MTC terminal classified into Category 2 and an MTC terminal classified into Category 5 are subordinate to the same MTC gateway.

The second embodiment of the present invention is made in view of the above circumstances as a focus point and according to the second embodiment of the present invention, a contradiction in category settings of MTC terminals can be prevented from arising. The second embodiment of the present invention will be described in detail below with reference to FIGS. 13 and 14.

Configuration of the Second Embodiment

Figure 13:
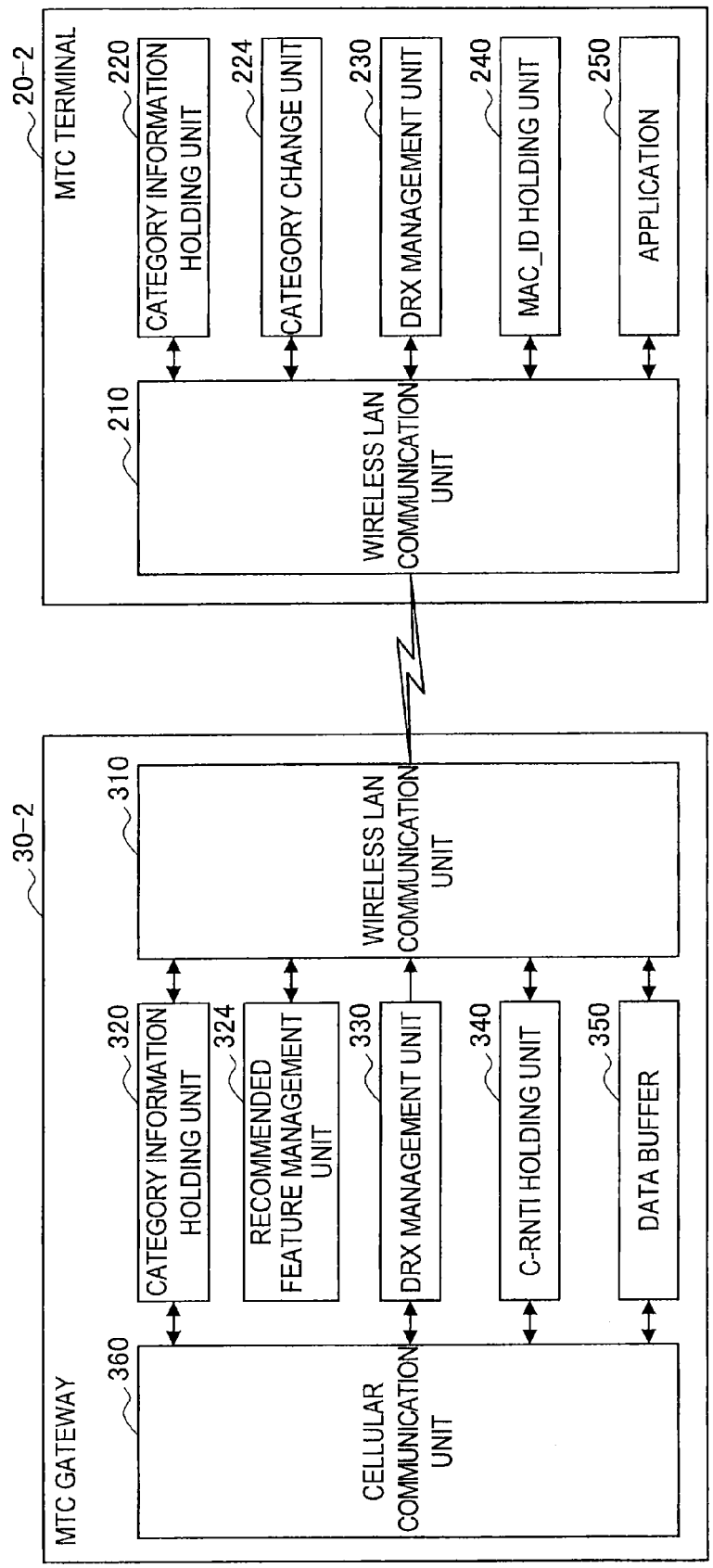
FIG. 13 is an explanatory view showing the configuration of the MTC terminal and the MTC gateway according to a second embodiment of the present invention.

FIG. 13 is an explanatory view showing the configuration of an MTC terminal 20-2 and an MTC gateway 30-2 according to the second embodiment of the present invention.

As shown in FIG. 13, the MTC terminal 20-2 includes the wireless LAN communication unit 210, the category information holding unit 220, a category change unit 224, the DRX management unit 230, the MAC_ID holding unit 240, and the application 250. The MTC gateway 30-2 includes the wireless LAN communication unit 310, the category information holding unit 320, a recommended feature management unit 324, the DRX management unit 330, the C-RNTI holding unit 340, and the data buffer 350. A configuration of the MTC terminal 20-2 and the MTC gateway 30-2 according to the second embodiment that is different from the configuration of the MTC terminal 20-1 and the MTC gateway 30-1 according to the first embodiment will be mainly described below.

The recommended feature management unit 324 (characteristic information selection unit) of the MTC gateway 30-2 selects features (characteristics) recommended to the subordinate MTC terminal 20 and causes the wireless LAN communication unit 310 to notify the MTC terminal 20-2 of the features. The recommended feature management unit 324 may make an inquiry about the category of each of the subordinate MTC terminals 20-2 to select recommended features for each feature item.

An example of selecting recommended features is described above, but the MTC gateway 30-2 may conversely select features to be avoided and cause the wireless LAN communication unit 310 to notify the MTC terminal 20-2 of the features. If, for example, the MTC terminal 20-2 whose "Mobility" is "High Mobility" is the majority, the recommended feature management unit 324 may select "Low Mobility" as features to be avoided.

The category change unit 224 of the MTC terminal 20-2 changes features of the MTC terminal 20-2 based on features notified from the MTC gateway 30-2. For example, a case when the category of the MTC terminal 20-2 is Category 2 shown in Table 3 and "High Mobility" is notified as recommended features from the MTC gateway 30-2 is considered. In this case, the category change unit 224 may change the category of the MTC terminal 20-2 to a category whose Mobility is "High Mobility" such as Category 4 or 5.

Also, a case when the category of the MTC terminal 20-2 is Category 2 shown in Table 3 and "Low Mobility" is notified as capabilities to be avoided from the MTC gateway 30-2 is considered. In this case, the category change unit 224 may change the category of the MTC terminal 20-2 to a category whose Mobility is "High Mobility" such as Category 4 or 5.

If it is difficult to change to a category satisfying features notified from the MTC gateway 30-2, the MTC terminal 20-2 may release the connection to the MTC gateway 30-2. An example of selecting recommended features is described above, but the MTC gateway 30-2 may select recommended categories or categories to be avoided and notify the MTC terminal 20-2 thereof.

Operation of the Second Embodiment

The configuration of the MTC terminal 20-2 and the MTC gateway 30-2 according to the second embodiment has been described. Next, the operation of the MTC terminal 20-2 and the MTC gateway 30-2 according to the second embodiment will be described with reference to FIG. 14.

Figure 14:
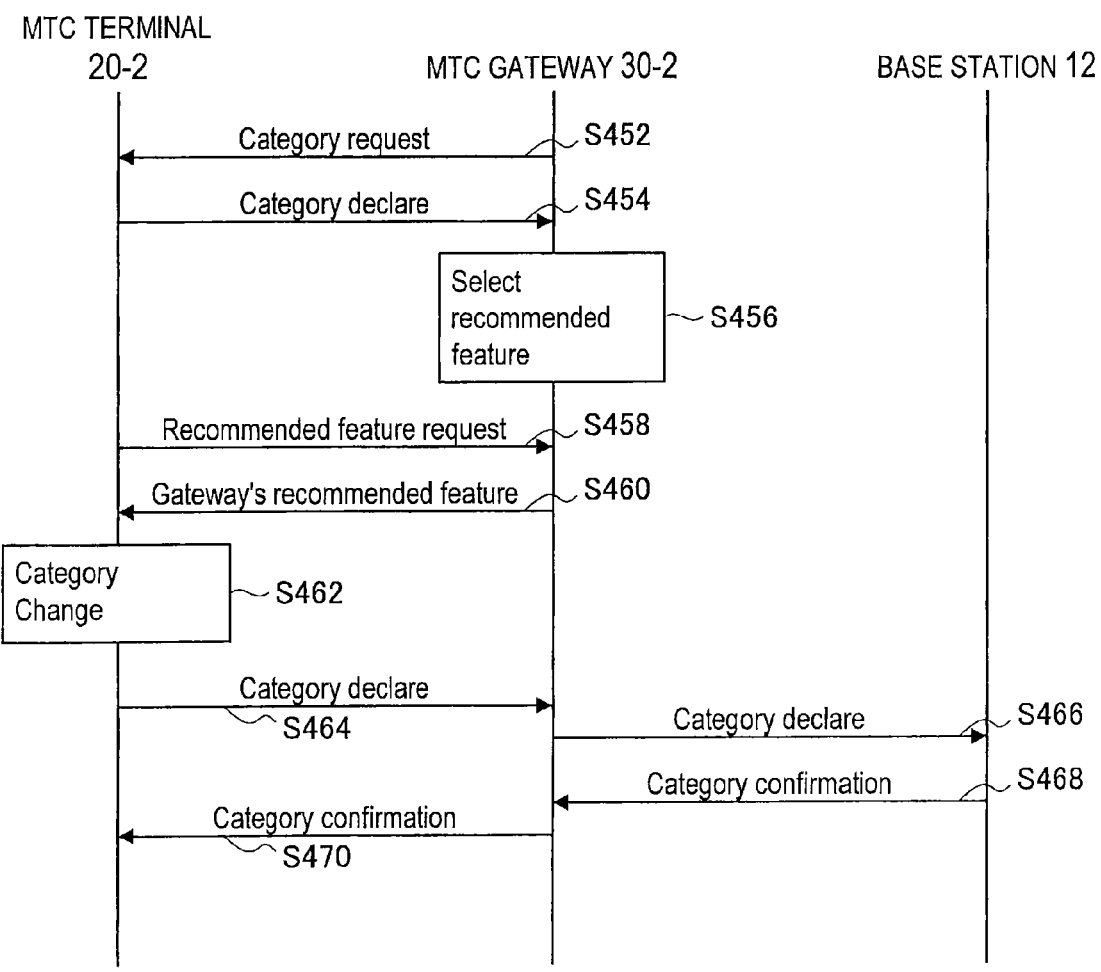
FIG. 14 is a sequence diagram showing an operation of the MTC terminal and the MTC gateway according to the second embodiment.

FIG. 14 is a sequence diagram showing the operation of the MTC terminal 20-2 and the MTC gateway 30-2 according to the second embodiment. As shown in FIG. 14, when the MTC gateway 30-2 first requests a notification of the category from the MTC terminal 20-2 (S452), the MTC terminal 20-2 notifies the MTC gateway 30-2 of the category thereof in response to the request from the MTC gateway 30-2 (S454).

When a plurality of the MTC terminals 20-2 is subordinate to the MTC gateway 30-2, the processing in S452 and S454 is performed for each of the subordinate MTC terminals 20-2. However, in S452, the MTC gateway 30-2 may transmit a category notification request to a plurality of the MTC terminals 20-2 in a broadcast at a time.

Next, the recommended feature management unit 324 of the MTC gateway 30-2 selects features recommended to the subordinate MTC terminal 20-2 based on the category of the subordinate MTC terminal 20-2 (S456). Subsequently, when a query about recommended features is received from the MTC terminal 20-2 (S458), the MTC gateway 30-2 notifies the MTC terminal 20-2 of the features selected in S456 (S460).

Next, if the notified features and features of the MTC terminal 20-2 are contradictory based on the features notified from the MTC gateway 30-2, the category change unit 224 of the MTC terminal 20-2 may change the features of the MTC terminal 20-2 if necessary (S462). Subsequently, the MTC terminal 20-2 holds the changed category in the category information holding unit 220 and notifies the MTC gateway 30-2 of the changed category (S464).

Next, the MTC gateway 30-2 notifies the base station 12 of the category notified from the MTC terminal 20-2 (S466). Then, when category setting confirmation is received from the base station 12 (S468), the MTC gateway 30-2 holds the category in the category information holding unit 320 and transmits the category setting confirmation to the MTC terminal 20-2 (S470).

According to the second embodiment of the present invention, as described above, the MTC gateway 30-2 can be introduced by preventing a contradiction of category settings of MTC terminals from arising.

2-3. Third Embodiment

Focus Point

When an MTC gateway is transparent when viewed from a base station and a plurality of MTC terminals is subordinate to the MTC gateway, a different DRX period (paging period) can be set to each of the MTC terminals. In this case, the MTC gateway intermittently receives a paging channel for each of the MTC terminals individually and thus, the number of times of reception increases and there is a concern about increased power consumption of the MTC gateway.

The third embodiment of the present invention is made in view of the above circumstances as a focus point and according to the third embodiment of the present invention, power consumption of an MTC gateway can be curbed by adjusting the DRX period for each MTC terminal. The third embodiment of the present invention will be described in detail below with reference to FIGS. 15 to 17.

Configuration of the Third Embodiment

Figure 15:
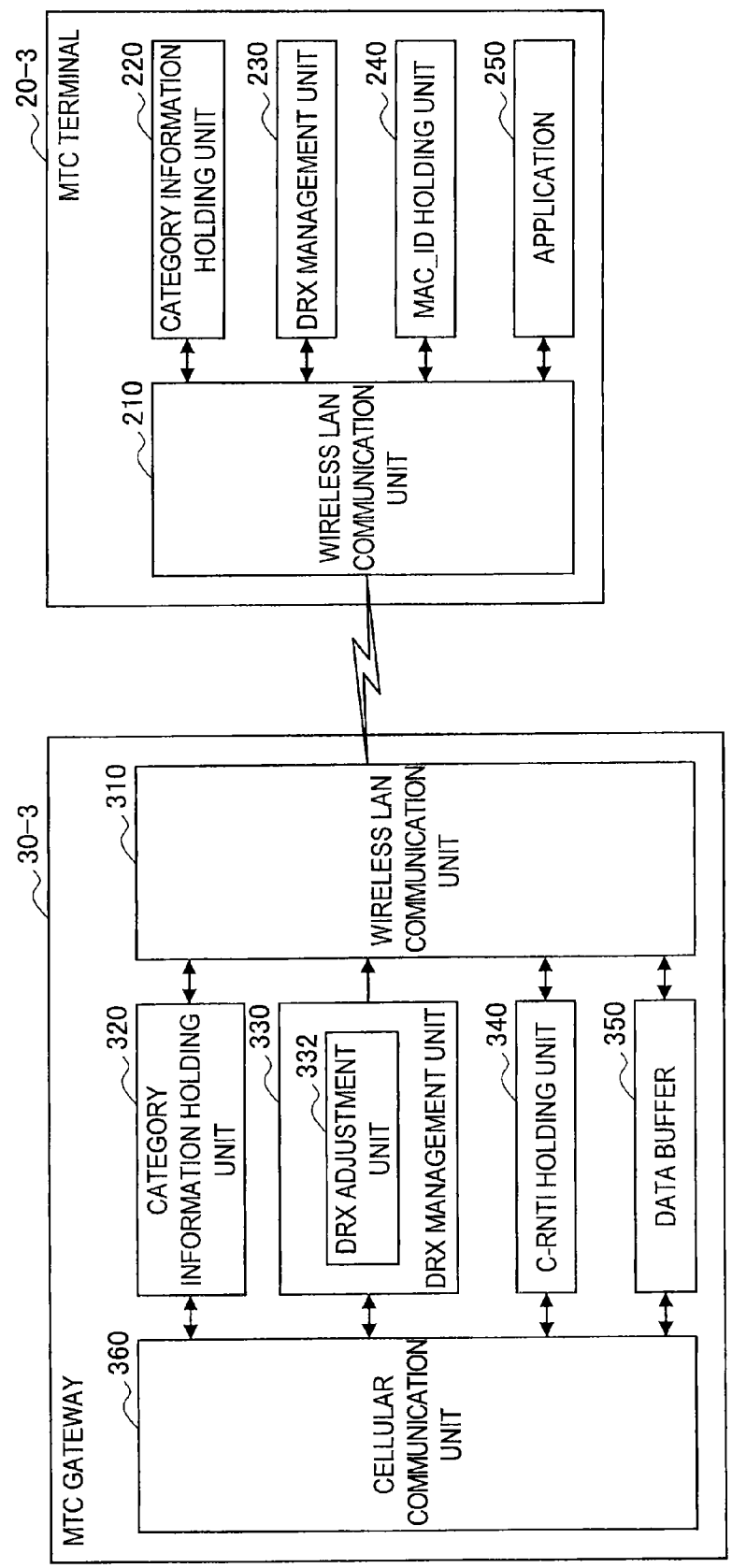
FIG. 15 is an explanatory view showing the configuration of the MTC terminal and the MTC gateway according to a third embodiment of the present invention.

FIG. 15 is an explanatory view showing the configuration of an MTC terminal 20-3 and an MTC gateway 30-3 according to the third embodiment of the present invention.

As shown in FIG. 15, the MTC terminal 20-3 includes the wireless LAN communication unit 210, the category information holding unit 220, the category change unit 224, the DRX management unit 230, the MAC_ID holding unit 240, and the application 250. The MTC gateway 30-3 includes the wireless LAN communication unit 310, the category information holding unit 320, the recommended feature management unit 324, the DRX management unit 330, the C-RNTI holding unit 340, and the data buffer 350. A configuration of the MTC terminal 20-3 and the MTC gateway 30-3 according to the third embodiment that is different from the configuration of the MTC terminal 20-1 and the MTC gateway 30-1 according to the first embodiment will be mainly described below.

The DRX management unit 330 of the MTC gateway 30-3 includes a DRX adjustment unit 332 that adjusts the DRX period of a plurality of the subordinate MTC terminals 20-3. More specifically, the DRX adjustment unit 332 adjusts the DRX period for each of the MTC terminals 20-3 in such a way that other DRX periods than the shortest DRX period are integral multiples of the shortest DRX period.

Figure 16:
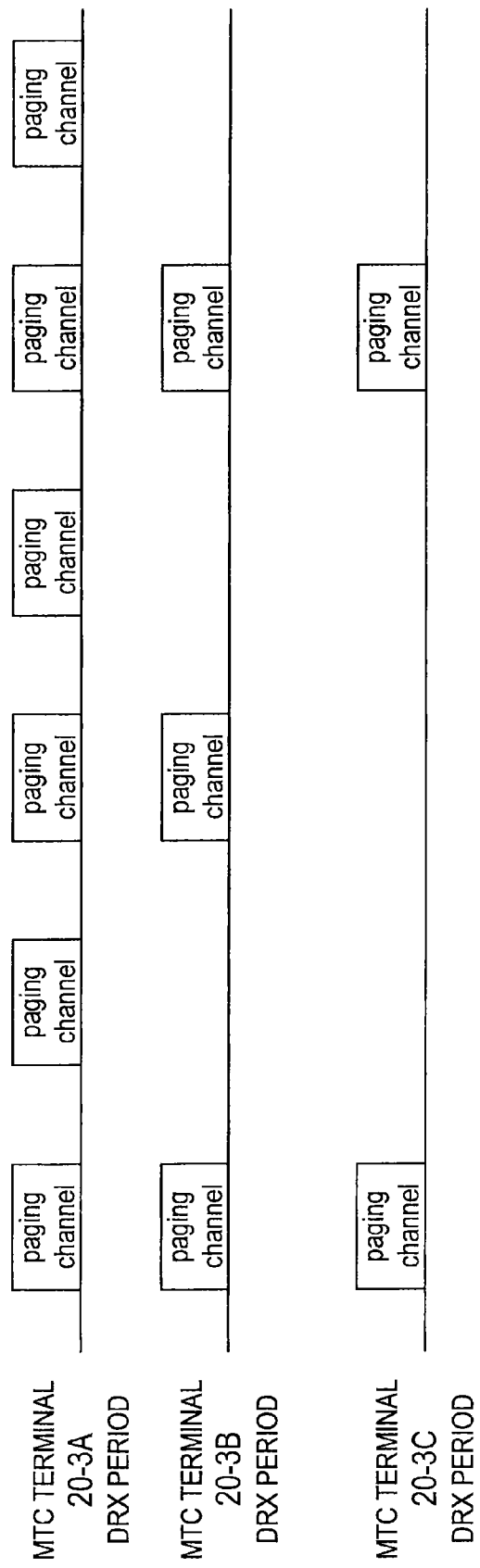
FIG. 16 is an explanatory view showing a relationship of each DRX period.

For example, as shown in FIG. 16, the DRX period for each of the MTC terminals 20-3 is adjusted in such a way that the DRX periods of an MTC terminal 20-3B and an MTC terminal 20-3C are integral multiples of the shortest DRX period of an MTC terminal 20-3A. By adopting the above configuration, when a paging channel is received in the shortest DRX period for the MTC terminal 20-3A, the cellular communication unit 360 of the MTC gateway 30-3 can also receive paging channels for the other MTC terminals 20-3B, 20-3C simultaneously. As a result, the number of times of reception of the MTC gateway 30-3 is reduced and thus, power consumption for DRX of the MTC gateway 30-3 can be curbed.

Operation of the Third Embodiment

The configuration of the MTC terminal 20-3 and the MTC gateway 30-3 according to the third embodiment has been described. Next, the operation of the MTC terminal 20-3 and the MTC gateway 30-3 according to the third embodiment will be described with reference to FIG. 17.

Figure 17:
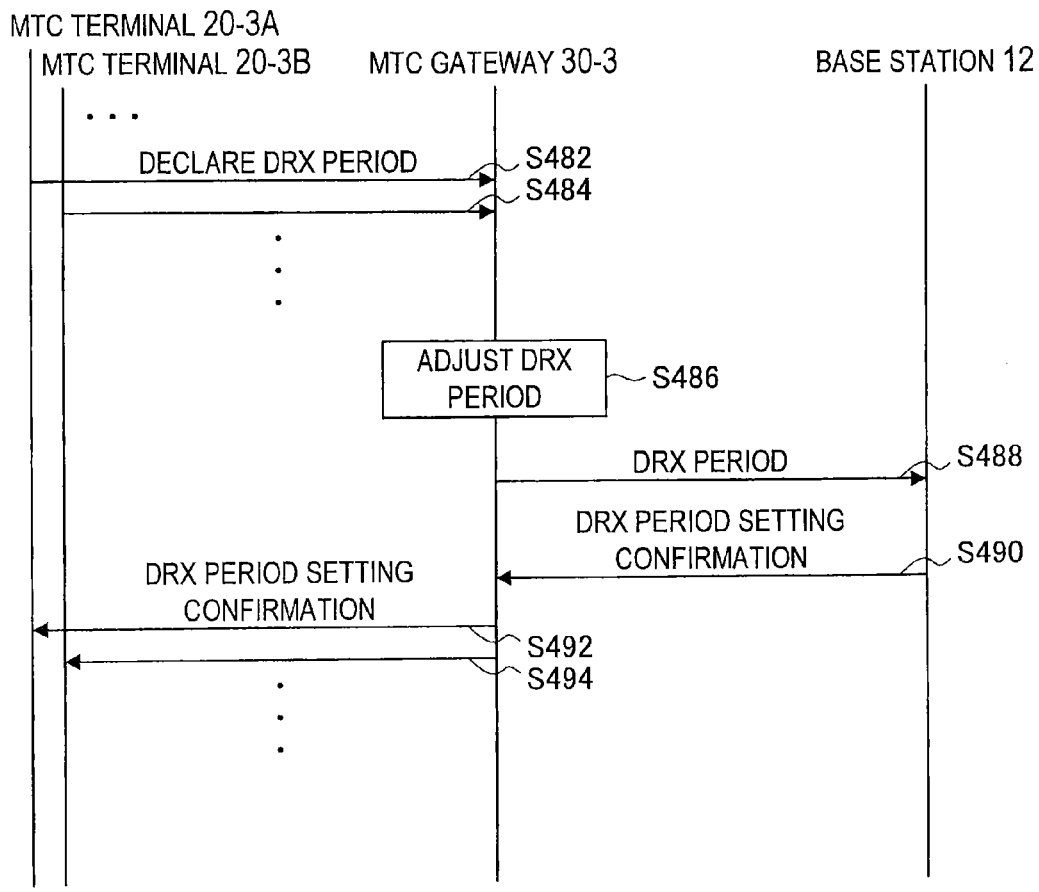
FIG. 17 is a sequence diagram showing the operation of the MTC terminal and the MTC gateway according to the third embodiment.

FIG. 17 is a sequence diagram showing the operation of the MTC terminal 20-3 and the MTC gateway 30-3 according to the third embodiment. As shown in FIG. 17, when a plurality of MTC terminals 20-3A, 20-3B, . . . subordinate to the MTC gateway 30-3 notifies the MTC gateway 30-3 of the respective DRX period (S482, S484), the DRX adjustment unit 332 of the MTC gateway 30-3 adjust the DRX period for each of the MTC terminals 20-3 (S486).

More specifically, the DRX adjustment unit 332 of the MTC gateway 30-3 adjusts the DRX period for each of the MTC terminals 20-3 in such a way that other DRX periods than the shortest DRX period are integral multiples of the shortest DRX period.

Subsequently, the MTC gateway 30-3 notifies the base station 12 of the adjusted DRX period for each of the MTC terminals 20-3 (S488) and, when a setting confirmation of the DRX period is received from the base station 12 (S490), transmits the setting confirmation of the DRX period to each of the MTC terminals 20-3 (S492, S494).

2-4. Fourth Embodiment

Focus Point

A case when both of an MTC terminal whose state is RRC_Connected and an MTC terminal whose state is RRC_IDLE are subordinate to an MTC gateway can be considered. RRC_Connected is an active state in which communication with a base station can be performed. RRC_IDLE is a sleep state in which power consumption is curbed by observing paging channels in the DRX period.

Even if the state is RRC_Connected, as shown in "Chapter 7.2 3GPP TS 36.300", the DRX period may be set. The DRX period is roughly divided into long and short periods and a transition to a long period is assumed when no paging channel is received in a predetermined period during operation in a short period. Switching between short and long periods is performed by a decision of a base station or control of UE (MTC terminal) from the base station.

The DRX period in RRC_IDLE described above is diverse and also short and long DRX periods in RRC_Connected exist, but if these DRX periods are not synchronized, there is a concern about a higher operation rate of the MTC gateway and increased power consumption.

The fourth embodiment of the present invention is made in view of the above circumstances as a focus point and according to the fourth embodiment of the present invention, power consumption of an MTC gateway can be curbed by adjusting the DRX period of each state. The fourth embodiment of the present invention will be described in detail below with reference to FIGS. 18 to 20.

Configuration of the Fourth Embodiment

Figure 18:
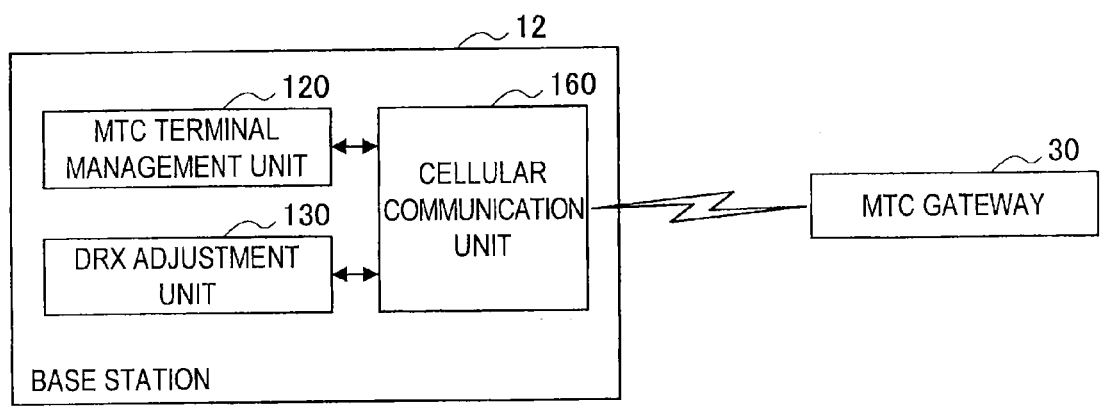
FIG. 18 is a functional block diagram showing the configuration of a base station according to a fourth embodiment.

FIG. 18 is a functional block diagram showing the configuration of the base station 12 according to the fourth embodiment. As shown in FIG. 18, the base station 12 includes an MTC terminal management unit 120, a DRX adjustment unit 130, and a cellular communication unit 160.

The MTC terminal management unit 120 manages the MTC terminals 20 subordinate to each of the MTC gateways 30 as a group and holds C-RNTI and P-RNTI (Paging Radio Network Temporary Identify) of each of the MTC terminals 20. P-RNTI is used for transmission of paging to the MTC terminal 20 whose state is RRC_IDLE and C-RNTI or P-RNTI is used for transmission of a control signal to the MTC terminal 20 whose state is RRC_Connected.

The cellular communication unit 160 performs communication with the MTC gateway 30 following a cellular communication method such as 4G.

The DRX adjustment unit 130 adjusts the DRX period of RRC_Connected and the DRX period of RRC_IDLE. More specifically, the DRX period of RRC_IDLE is longer than the DRX period of RRC_Connected and thus, the DRX adjustment unit 130 adjusts each DRX period in such a way that the DRX period of RRC_IDLE is an integral multiple of the long DRX period of RRC_Connected. Also, the DRX adjustment unit 130 adjusts each DRX period in such a way that the long DRX period is an integral multiple of the short DRX period. Further, the DRX adjustment unit 130 makes uniform phases of the DRX period of RRC_IDLE, the short DRX period, and the long DRX period.

Figure 19:
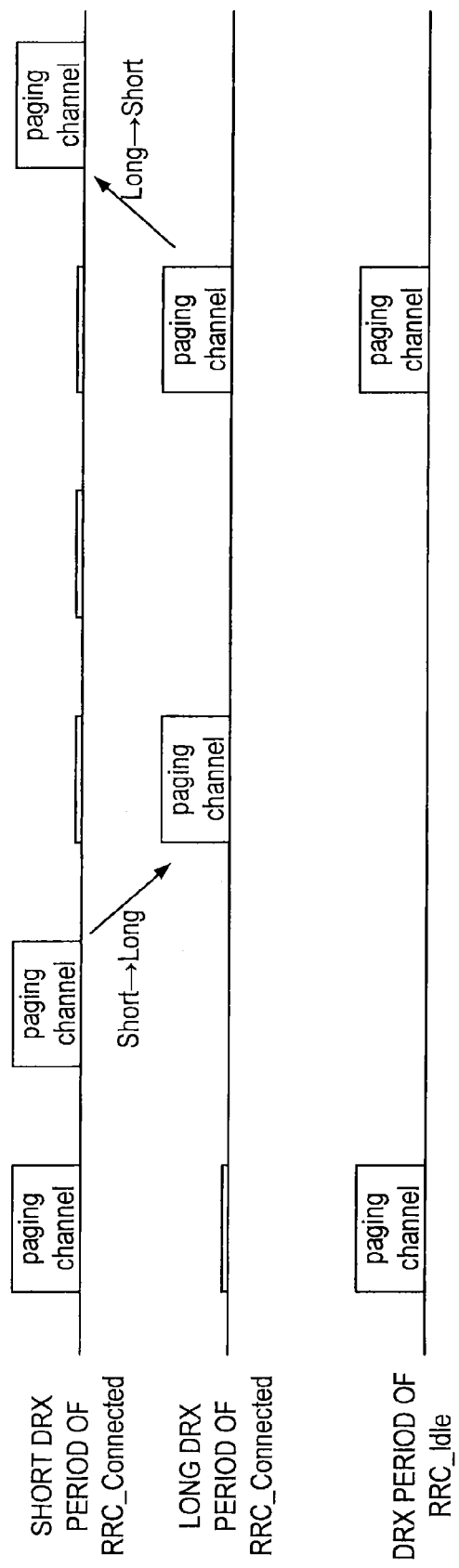
FIG. 19 is an explanatory view showing the relationship of each DRX period.

For example, as shown in FIG. 19, by adjusting lengths and phases of the DRX period of RRC_IDLE, the short DRX period, and the long DRX period, DRX of RRC_IDLE is performed simultaneously with DRX of RRC_Connected in both cases of the transition from the short DRX period to the long DRX period and the transition from the long DRX period to the short DRX period.

Therefore, even if both of the MTC terminal 20 whose state is RRC_Connected and the MTC terminal 20 whose state is RRC_IDLE are subordinate to the MTC gateway 30, power consumption of the MTC gateway 30 can be curbed by reducing the operation rate of the MTC gateway 30.

Operation of the Fourth Embodiment

The configuration of the base station 12 according to the fourth embodiment has been described. Next, the operation according to the fourth embodiment will be described with reference to FIG. 20.

Figure 20:
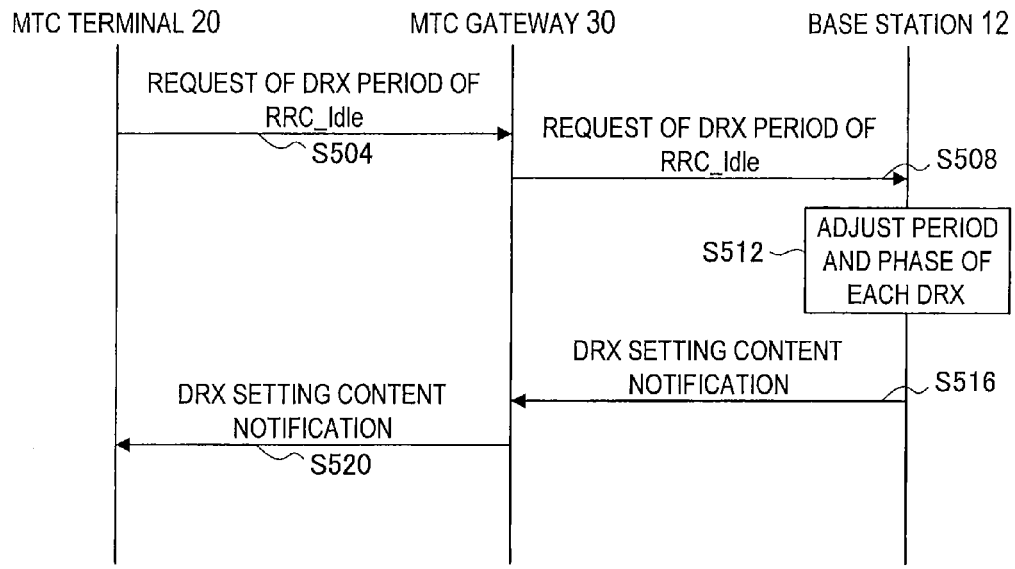
FIG. 20 is a sequence diagram showing the operation according to the fourth embodiment.

FIG. 20 is a sequence diagram showing the operation according to the fourth embodiment. As shown in FIG. 20, when the MTC terminal 20 first requests the DRX period of RRC_IDLE (S504), the MTC gateway 30 transfers the request to the base station 12 (S508).

Then, the DRX adjustment unit 130 of the base station 12 adjusts the DRX period of RRC_IDLE so as to be an integral multiple of the long DRX period of RRC_Connected and also phases of the DRX period of RRC_IDLE and the long DRX period are uniform (S512). Subsequently, the MTC terminal 20 is notified of setting content of the DRX period via the MTC gateway 30 (S516, S520).

2-5. Fifth Embodiment

Focus Point

The first embodiment in which the MTC gateway 30 performs random access to each of the MTC terminals 20-1 to obtain C-RNTI and the timing advance value of each of the MTC terminals 20-1 has been described with reference to FIG. 9.

However, the timing advance value is used only for an uplink between the MTC gateway and base station. Thus, the timing advance value of the MTC terminal is considered to be enough. However, currently there is no procedure for using the timing advance value acquired by another terminal for communication of some terminal.

The fifth embodiment of the present invention is made in view of the above circumstances as a focus point and according to the fifth embodiment of the present invention, signaling by random access and the load of an MTC gateway can be reduced. The fifth embodiment of the present invention will be described in detail below with reference to FIG. 21.

Operation of the Fifth Embodiment

Figure 21:
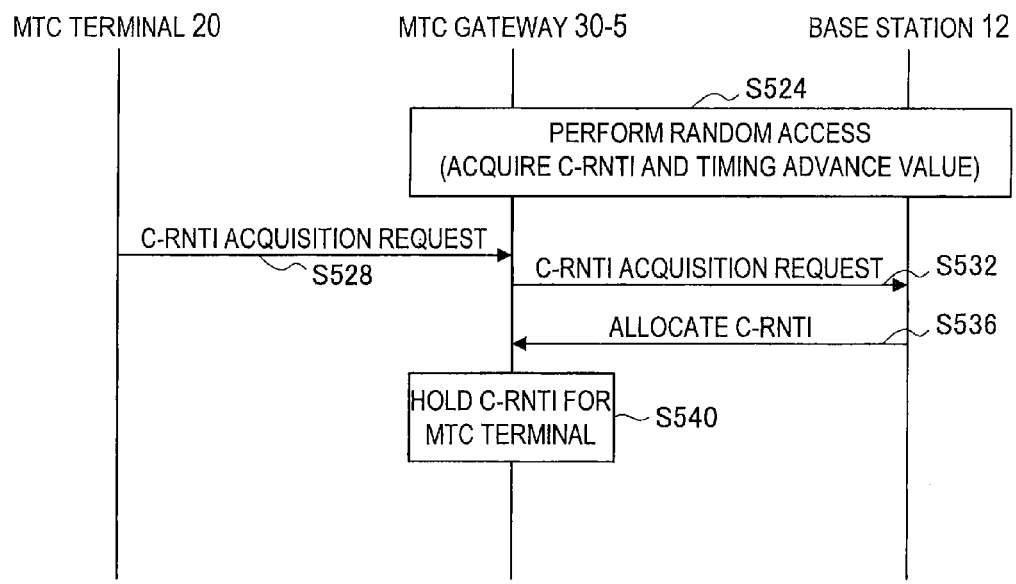
FIG. 21 is a sequence diagram showing the operation according to a fifth embodiment.

FIG. 21 is a sequence diagram showing the operation according to the fifth embodiment. As shown in FIG. 21, an MTC gateway 30-5 first performs random access to the base station 12 to acquire the timing advance value (S524).

Subsequently, when an acquisition request of C-RNTI is received from the MTC terminal 20 (S528), the MTC gateway 30-5 transmits the acquisition request of C-RNTI for the MTC terminal 20 to the base station 12 (S532).

Then, when C-RNTI for the MTC terminal 20 is provided in response to the request from the base station 12 (S536), the MTC gateway 30-5 holds the C-RNTI for the MTC terminal 20 in the C-RNTI holding unit 340 (S540). The MTC gateway 30-5 may or may not notify the MTC terminal 20 of the C-RNTI.

Subsequently, the MTC gateway 30-5 performs uplink communication of the MTC terminal 20 by using the C-RNTI provided in S536 and the timing advance value acquired in S524. That is, the MTC gateway 30-5 uses the common timing advance value acquired in S524 for uplink communication of a plurality of subordinate MTC terminals 20.

According to the fifth embodiment described above, the number of times of random access by the MTC gateway 30-5 decreases and thus, signaling by random access and the load of the MTC gateway 30-5 can be reduced.

3. Conclusion

According to the embodiments of the present invention, as described above, an MTC gateway having a transparent aspect can be realized while satisfying the delay requirements in 4G. Also according to the embodiments of the present invention, an MTC gateway can be introduced by preventing a contradiction of category settings of MTC terminals from arising. Also according to the embodiments of the present invention, power consumption for DRX of an MTC gateway can be curbed. Also according to the embodiments of the present invention, signaling by random access and the load of an MTC gateway can be reduced.

The preferred embodiments of the present invention have been described above with reference to the accompanying drawings, whilst the technical scope of the present invention is not limited to the above examples, of course. A person skilled in the art may find various alterations and modifications within the scope of the appended claims, and it should be understood that they will naturally come under the technical scope of the present invention.

For example, each step in processing of the MTC terminal 20 or the MTC gateway 30 herein does not necessarily have to be executed along a time series in the order described in a sequence diagram. For example, each step in processing of the MTC terminal 20 or the MTC gateway 30 may be executed in a different order from the order described in a sequence diagram or in parallel.

In addition, a computer program causing hardware such as a CPU, ROM, and RAM contained in the MTC terminal 20, the MTC gateway 30, or the base station 12 to fulfill the function equivalent to each configuration of the MTC terminal 20, the MTC gateway 30, and the base station 12 described above. Also, a storage medium storing the computer program is provided.

REFERENCE SIGNS LIST

10 Operator domain
12 Base station
20 MTC terminal
30 MTC gateway
40 MTC server
120 MTC terminal management unit
130, 332 DRX adjustment unit
160, 360 Cellular communication unit
210, 310 Wireless LAN communication unit
220, 320 Category information holding unit
230, 330 DRX management unit
240 MAC_ID holding unit
250 Application
324 Recommended feature management unit
340 C-RNTI holding unit
350 Data buffer

The invention claimed is:

1. A communication system comprising:
   a base station;
   a plurality of communication apparatuses; and
   a gateway apparatus including:
      a first communication unit that communicates with the base station in a first communication method,
      a second communication unit that communicates with the plurality of communication apparatuses in a second communication method,
      an identification information holding unit that holds a correspondence between first identification information in the first communication method and second identification information in the second communication method of each of the plurality of communication apparatuses, wherein the second communication unit communicates with each of the plurality of communication apparatuses using the second identification information of the plurality of communication apparatuses,
      a category information holding unit to share category information, showing a characteristic of each of the plurality of communication apparatuses, with each of the plurality of communication apparatuses, and
      an adjustment unit that adjusts each of a plurality of reception periods for the first communication unit to perform intermittent reception for each of the plurality of communication apparatuses,
      wherein the first communication unit performs communication of each of the plurality of communication apparatuses in accordance with the category information with the base station using the first identification information of each of the plurality of communication apparatuses.

2. The communication system according to claim 1, wherein the second communication unit transmits characteristic information to each of the plurality of communication apparatuses and receives the category information of each of the plurality of communication apparatuses changed based on the characteristic information from each of the plurality of communication apparatuses,
   wherein the first communication unit transmits the category information received by the second communication unit to the base station, and
   wherein the category information holding unit holds the category information received by the second communication unit.

3. The communication system according to claim 2, wherein the gateway apparatus further includes a characteristic information selection unit that selects the characteristic information based on the category information received from each of the plurality of communication apparatuses and before being changed.

4. The communication system according to claim 3, wherein the characteristic information shows a characteristic recommended to each of the plurality of communication apparatuses.

5. The communication system according to claim 1, wherein the gateway apparatus further includes an intermittent reception management unit that holds a reception period to intermittently receive paging from the base station for each of the plurality of communication apparatuses and causes the second communication unit to notify each of the plurality of communication apparatuses of the reception period having an offset for the reception period.

6. The communication system according to claim 1, wherein, in an event data addressed to each of the plurality of communication apparatuses is received by the first communication unit from the base station, the second communication unit transmits the data to each of the plurality of communication apparatuses, and
   wherein, in the event the data addressed to each of the plurality of communication apparatuses is successfully received, the first communication unit transmits a reception confirmation signal to the base station before checking whether the data is successfully received by each of the plurality of communication apparatuses.

7. The communication system according to claim 1, wherein the adjustment unit adjusts each of the plurality of reception periods in a manner that a reception period other than one reception period is an integral multiple of the one reception period.

8. The communication system according to claim 1, wherein the gateway apparatus communicates with the plurality of communication apparatuses,
   wherein the first communication unit intermittently receives in a short reception period or a long reception period for communication apparatuses of the plurality of communication apparatuses in an active state and intermittently receives in a sleep reception period for communication apparatuses of the plurality of communication apparatuses in a sleep state, and
   wherein the long reception period and the sleep reception period are set as integral multiples of the short reception period and each reception period is set in a manner that phases thereof are uniform.

9. The communication system according to claim 1, wherein the first communication unit acquires a timing advance value by performing a random access procedure to the base station and uses the timing advance value for communication with the plurality of communication apparatuses.

10. The communication system according to claim 9, wherein the first communication unit transmits an acquisition request of the first identification information of each of the plurality of communication apparatuses to the base station to acquire the first identification information of each of the plurality of communication apparatuses from the base station.

11. The communication system according to claim 1, wherein the first communication method is a mobile communication method and the second communication method is a wireless LAN communication method.

12. The communication system according to claim 1,
wherein the plurality of communication apparatuses are implemented in the gateway apparatus, and
wherein the first communication method is a mobile communication method and the second communication method is a communication method using a dedicated interface in the gateway apparatus.

13. A communication apparatus configured to
communicate with a gateway apparatus in a second communication method, the gateway apparatus communicating with a base station in a first communication method, communicating with a plurality of communication apparatuses in the second communication method, holding a correspondence between first identification information in the first communication method and second identification information in the second communication method of each of the plurality of communication apparatuses, sharing category information showing a characteristic of each of the plurality of communication apparatuses, and adjusting each of a plurality of reception periods to perform intermittent reception for each of the plurality of communication apparatuses,
wherein the gateway apparatus communicates with each of the plurality of communication apparatuses using the second identification information of each of the plurality of communication apparatuses.

* * * * *